United States Patent
Fujisawa et al.

(10) Patent No.: US 10,457,169 B2
(45) Date of Patent: Oct. 29, 2019

(54) VEHICLE SEAT

(71) Applicant: TOYOTA BOSHOKU KABUSHIKI KAISHA, Aichi-ken (JP)

(72) Inventors: Hideki Fujisawa, Aichi-ken (JP); Sho Kume, Aichi-ken (JP); Kiyoshi Oshima, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 234 days.

(21) Appl. No.: 15/603,742

(22) Filed: May 24, 2017

(65) Prior Publication Data
US 2017/0341543 A1   Nov. 30, 2017

(30) Foreign Application Priority Data

May 26, 2016   (JP) .................. 2016-105258

(51) Int. Cl.
*B64D 11/06* (2006.01)
*B60N 2/30* (2006.01)
*B60N 2/90* (2018.01)

(52) U.S. Cl.
CPC .......... *B60N 2/3045* (2013.01); *B60N 2/3011* (2013.01); *B60N 2/995* (2018.02); *B64D 11/0643* (2014.12)

(58) Field of Classification Search
CPC . B60N 2/62; B60N 2/995; B60N 2/20; B60N 2/3011; B60N 2/3045; B64D 11/06; B64D 11/0602; B64D 11/0639; B64D 11/0643
See application file for complete search history.

(56) References Cited

U.S. PATENT DOCUMENTS

| 6,752,443 B1 * | 6/2004 | Thompson | B60N 2/30 296/24.34 |
| 7,195,316 B2 * | 3/2007 | Shimasaki | A47C 7/024 297/284.11 |
| 2002/0109389 A1 * | 8/2002 | Satoh | B60N 2/0292 297/423.19 |

(Continued)

FOREIGN PATENT DOCUMENTS

| EP | 1116652 A2 * | 7/2001 | ........... A47C 1/0352 |
| FR | 2896200 A3 * | 7/2007 | ............. B60N 2/995 |

(Continued)

*Primary Examiner* — Ryan D Kwiecinski
(74) *Attorney, Agent, or Firm* — Greenblum & Bernstein, P.L.C.

(57) ABSTRACT

A vehicle seat includes: a base mounted to a floor of a vehicle; a seat cushion that is placed on the base and allowed to be tipped up with a rotating shaft as a fulcrum; an ottoman that is provided on a front side of the seat cushion and extractable between a normal position and an extracted position; a seat back that is provided in a rear end of the seat cushion; and a storage locking mechanism that is capable of relatively moving the ottoman with respect to the seat cushion in a storing direction which is a direction opposite to an extracting direction, wherein the storage locking mechanism is operated such that the seat back becomes in a forward-tiltable state and/or the seat cushion becomes in a tippable state, and locking of the locking mechanism is released so that the ottoman becomes movable in the storing direction.

5 Claims, 10 Drawing Sheets

(56) References Cited

U.S. PATENT DOCUMENTS

| | | | |
|---|---|---|---|
| 2004/0004383 A1* | 1/2004 | Laurent | B60N 2/34 297/354.13 |
| 2014/0300145 A1* | 10/2014 | Beroth | B64D 11/06 297/83 |
| 2014/0375087 A1* | 12/2014 | Kuno | B60N 2/22 297/69 |

FOREIGN PATENT DOCUMENTS

| | | | | |
|---|---|---|---|---|
| JP | 2001087074 A | * | 4/2001 | B60N 2/34 |
| JP | 2004-65559 | | 3/2004 | |
| JP | 2009125276 A | * | 6/2009 | B60N 2/0232 |
| JP | 2015003632 A | * | 1/2015 | B60N 2/22 |

* cited by examiner

VEHICLE SEAT

CROSS-REFERENCE TO RELATED APPLICATION

This application claims priorities from Japanese Patent Application No. 2016-105258 filed on May 26, 2016, the entire subject matters of which is incorporated herein by reference.

TECHNICAL FIELD

The present disclosure relates to a vehicle seat, particularly to a vehicle seat with a foldable ottoman for extending a luggage compartment space and a walk-through space of an automobile.

BACKGROUND

In the related art, for example, attachment/detachment of the seat or the underfloor storage of the seat is used as a countermeasure for enlarging a luggage compartment space and a walk-through space of a vehicle such as an automobile. A proposed configuration that provides the attachment/detachment of the seat is exemplified by a publication JP-A-2004-065559. The disclosure of JP-A-2004-065559 relates to a vehicle seat structure in which a foldable table is connected on one of right and left sides of the three-passenger seat, and a detachable seat which can be attached and detached is provided in an engaging part provided in the table, and which secures a walk-through space by attaching in and detaching from the middle seat of the three-passenger seat.

However, in order to improve safety of an occupant, or cope with an automobile assessment in foreign countries, it is preferable to mount various electrical components such as a seat side airbag or a seat belt reminder in the seat of the automobile. For this reason, a wire harness for supplying power to the electrical components is wired in the seat. In consideration of the releasing of the harness, it is not preferable that the seat is attached or detached.

In a method of extending a luggage compartment space, a walk-through space, and the like of the vehicle by an underfloor storage of the seat, the vehicle or the seat is largely restricted, and the method is easily failed due to the package of the vehicle, and the appearance of the seat is easily deteriorated depending on the seat to be stored.

In the vehicle in which an interior space of a one box car and the like is relatively large, an ottoman mechanism is included in a seat shape after a second row. However, when the seat having the ottoman mechanism is stored, the seat may not be sufficiently stored.

SUMMARY

The present disclosure is made in consideration of the above-mentioned circumstances, and one of objects of the present disclosure is to provide a vehicle seat having a high practical utility in which a luggage compartment space and a walk-through space of a vehicle can be extended even in the case of a seat with an ottoman mechanism by a storage of an ottoman, a slide of a seat, and the like.

According to an illustrative embodiment of the present disclosure, there is provided a vehicle seat with a foldable ottoman which includes: a base mounted to a floor of a vehicle; a seat cushion that is placed on the base and allowed to be tipped up with a rotating shaft as a fulcrum; an ottoman that is provided on a front side of the seat cushion and extractable between a normal position and an extracted position; a seat back that is provided in a rear end of the seat cushion; and a storage locking mechanism that is capable of relatively moving the ottoman with respect to the seat cushion in a storing direction which is a direction opposite to an extracting direction, wherein the storage locking mechanism is operated such that the seat back becomes in a forward-tiltable state and/or the seat cushion becomes in a tippable state, and locking of the locking mechanism is released so that the ottoman becomes movable in the storing direction.

BRIEF DESCRIPTION OF THE DRAWINGS

In the accompanying drawings:

FIG. 7 is a schematic view illustrating a state before the pulling-in type ottoman is pulled in;

FIG. 8 is a schematic view illustrating a state after the pulling-in type ottoman is pulled in;

DETAILED DESCRIPTION

Figure 1:
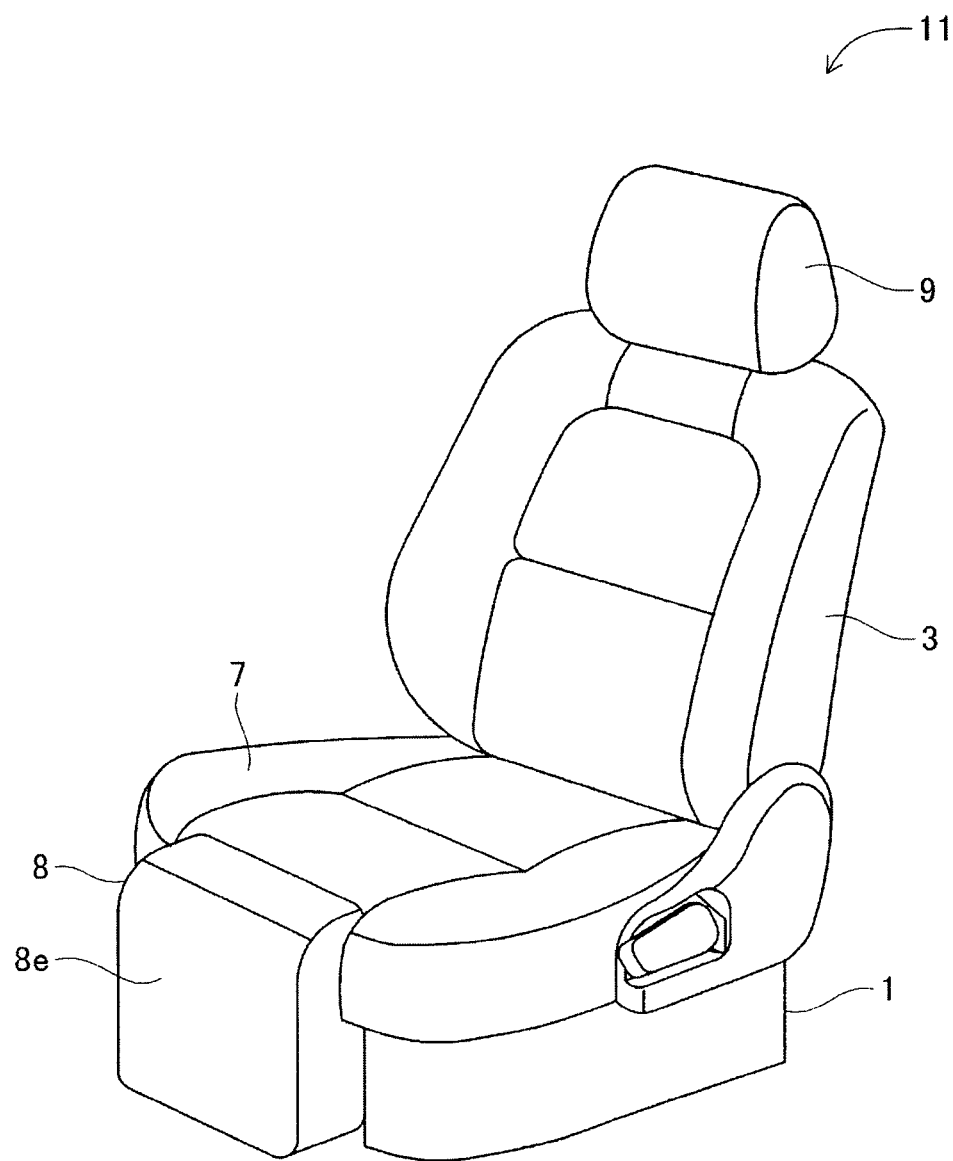
FIG. 1 is a perspective view illustrating a vehicle seat in front view.

FIG. 1 illustrates a vehicle seat 11 according to the present disclosure in oblique front view. As well known, an ottoman 8 supports a leg of a seated occupant, and can be switched between a normal state where the ottoman is contained downward on a front side of a seat cushion 7 and an expanded state where the ottoman is expanded forward from the seat cushion 7. However, in the present disclosure, the ottoman 8 can relatively move in a storing direction Z (see FIGS. 8 and 10) which is a direction opposite to an extracting direction in conjunction with tip-up of the seat cushion 7 and the like so as to be in a stored state.

Hereinafter, an embodiment of the present disclosure will be described appropriately with the drawings. Herein, the present disclosure is related to a vehicle seat which may be configured in one of two types of a pulling-in type and a pressing-in type, and will be described respectively. In the pulling-in type, the connecting member 40 is used to tip up the seat cushion 7 so as to pull in (rotate in the storing direction Z) the ottoman 8. In the pressing-in type, the connecting member 40 used in the pulling-in type is not used, the ottoman 8 is pressed in (rotated in the storing direction Z) by pressing a surface (calf placing surface 8e) of the ottoman 8 for placing the calf.

In the related art, there are many seat shapes in which the ottoman 8 is connected to the seat cushion 7, and the ottoman 8 is also tipped up together with the seat cushion 7 when the seat cushion 7 is tipped up.

Generally, in seats of the vehicle, a second-row seat is disposed on the rear side of a first-row seat. Among vehicle types, there is a wagon type in which a luggage compartment space is provided on the rear side of the second-row seat, and further, in a one box car and the like, a third-row seat may be disposed on the rear side of the second-row seat.

In the case of the wagon type and the like, in order to enlarge the luggage compartment space on the rear side of the second-row seat, it is necessary to slide the second-row seat forward as much as possible. In addition, in the case of the one box car and the like, when the occupant gets on and off the third-row seat on the rear side of the second-row seat, it becomes easy to get on and off if a walk-through space between the second-row seat and the third-row seat is enlarged. Thus, also in this case, it is necessary to slide the second-row seat forward as much as possible.

However, in a case where the ottoman 8 is provided in the seat cushion 7, when a seat back 3 of the second-row seat is tilted forward, and the second-row seat is advanced to a limit position, the luggage compartment space can be extended to some extent. However, when the second-row seat is advanced to the limit position, the front side of the seat cushion 7 of the second-row seat and/or the ottoman 8 provided in the seat cushion 7 of the second-row seat contacts the back surface of the seat back 3 of the first-row seat, and thus, it is not possible to slide the second-row seat further forward. Therefore, in this case, it may be difficult to secure a sufficient space in the luggage compartment space and the walk-through space on the rear side of the second-row seat.

Also in a case where the seat cushion 7 is tipped up further, it is possible to extend the luggage compartment space to some extent. However, the ottoman 8 provided in the seat cushion 7 of the second-row seat contacts the back surface of the seat back 3 of the first-row seat, and thus it is not possible to slide the second-row seat further forward. Therefore, also in this case, it may be difficult to secure a sufficient space in the luggage compartment space and the walk-through space on the rear side of the second-row seat.

Figure 9:
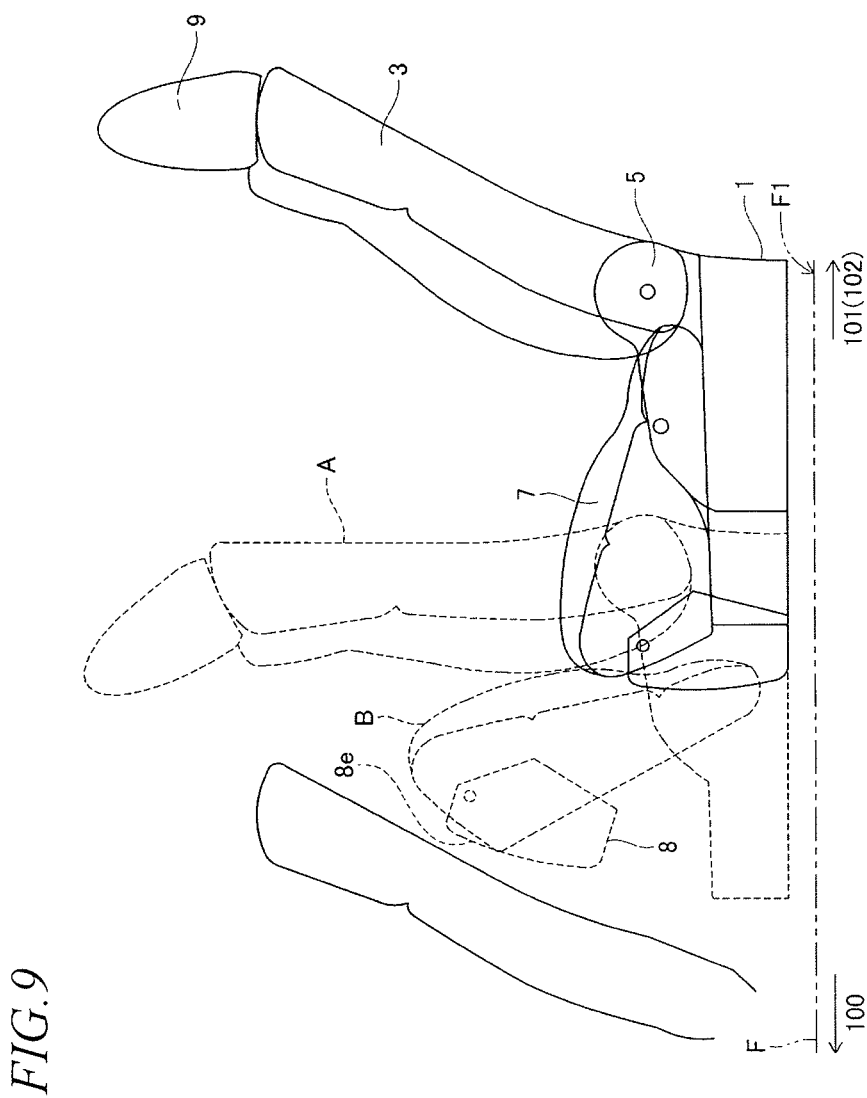
FIG. 9 is a side view illustrating a state where the vehicle seat is slid to an advance limit position.

Therefore, as illustrated in FIG. 9, according to the present disclosure, the ottoman 8 is moved in the storing direction Z in conjunction with the tip-up and the like of the seat cushion 7, and finally is moved to the stored state. Thus, even in a case where the second-row seat is advanced to the limit position, the seat cushion 7 can be slid forward further compared to the case of the conventional seat cushion 7 with the ottoman 8. Accordingly, it is possible to secure a sufficient space in the luggage compartment space on the rear side of the second-row seat, and it is possible to secure a sufficient space in the walk-through space between the second-row seat and the third-row seat.

Figure 10:
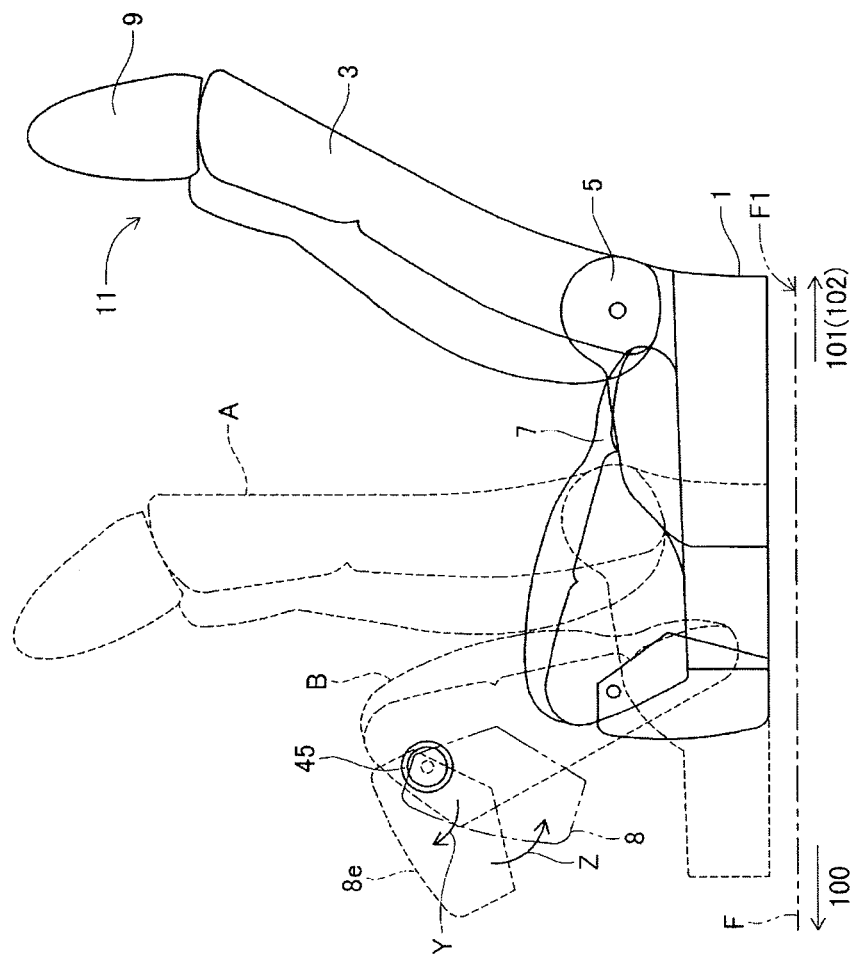
FIG. 10 is a schematic view illustrating a normal state to a stored state for the pressing-in type ottoman.

Herein, the states of the seat will be described with reference to the drawings. In FIGS. 9 and 10, in the seat back 3, a solid line indicates a state where the occupant can seat thereon, and a broken line indicates a forward inclined state A. Each state can be entered by using a reclining mechanism 5. Further, similarly, in FIG. 10, in the seat cushion 7, the solid line indicates a state where the occupant can seat thereon, and the broken line indicates a tipped-up state. Each state can be entered by using a tip-up mechanism.

In addition to an expanded state as a normal use state and a normal state where the ottoman is hanged in the seat cushion 7, the states of the ottoman 8 include a stored state where the ottoman 8 is rotated as indicated by the broken line in FIGS. 9 and 10. In addition, as illustrated in FIGS. 9 and 10, the front side of the vehicle seat 11 is a first-row seat side 100, and the rear side of the vehicle seat 11 is a luggage compartment space side 101 and a walk-through space side 102.

Components, operations and the like thereof will be described below.

The components regarding the vehicle seat 11 are roughly divided into a vehicle seat body, a base 1 on which the vehicle seat body can be placed, and the like. Components configuring the vehicle seat body include the seat cushion 7 which supports the seated occupant from below, the seat back 3 which is provided in the rear end of the seat cushion 7 and supports the back surface of the seated occupant, the ottoman 8 for placing the leg of the seated occupant, a headrest 9 which supports a head of a driver, and the like.

When the base 1 is simply described, as illustrated in FIG. 1, the base 1 supports the vehicle seat body by placing it thereon, and is placed on a placement surface F1 (see FIGS. 9 and 10) of a floor F of the vehicle. However, the base 1 may be also provided to be separated from the floor F of the vehicle, and it is desirable that a seat sliding mechanism (to be described later) is disposed in which the base 1 can be moved in a progressing direction of the vehicle or a direction opposite to the progressing direction in the separated portion between the floor F and the base 1. With such a configuration, the vehicle seat 11 can be slid in the progressing direction of the vehicle or the direction opposite to the progressing direction.

The base 1 is considered in various configurations and shapes. For example, in addition to a pipe frame (not illustrated) being laid between both right and left surfaces, a frame substantially U-shape in a plan view in which the rear side of both right and left surfaces is connected with the rear frame (not illustrated), and the front surface side thereof is opened is considered.

The seat cushion 7 configuring the vehicle seat body is placed on the placement surface of both right and left surfaces of the base 1 or the placement surface of both right and left surfaces and the rear frame. Further, in order to tip up the seat cushion 7, for example, a configuration is considered in which a rotating shaft 15 (see FIGS. 7 and 8) is laid between both right and left surfaces of the base 1, the seat cushion 7 is pivotally supported by the rotating shaft 15, and the seat cushion 7 can be tipped up with the rotating shaft 15 as a fulcrum.

In order to support the vehicle seat body, it is necessary to improve the support rigidity of the base 1. In addition, since the base 1 of the present disclosure supports the vehicle seat body by placing it thereon, the base 1 is not limited to the above-described configuration and shape without departing from the spirit and scope thereof.

Figure 3:
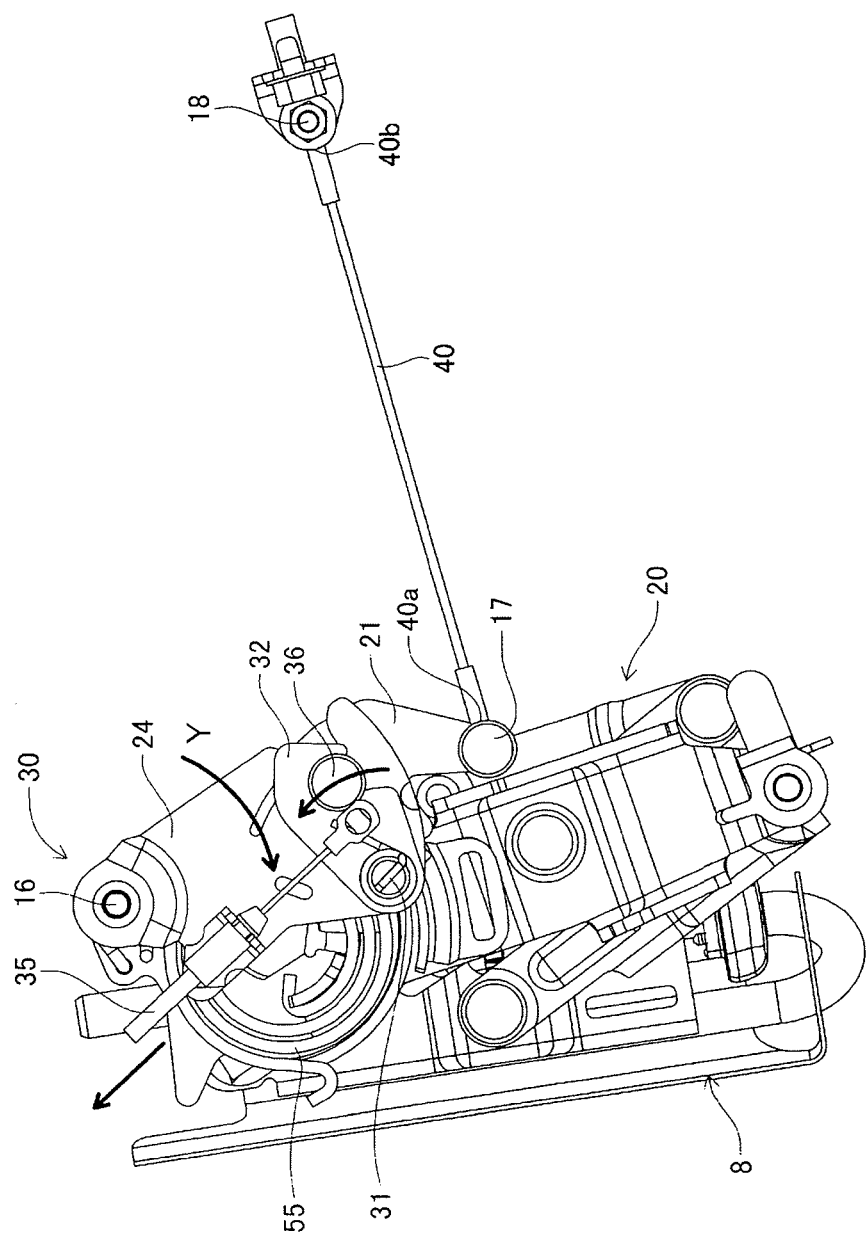
FIG. 3 is a side view illustrating the other side of the link mechanism and the ottoman as the pulling-in type example.

As illustrated in FIG. 1, the ottoman 8 is provided on the front side of the seat cushion 7. In addition, as illustrated in FIG. 3, the ottoman 8 is provided to be in the expanded state or the normal state with the link mechanism 20 interposed on the front side of the seat cushion 7.

Herein, the ottoman 8 is provided on the front side of the seat cushion 7. A supporting surface (calf placing surface 8e), which supports the leg (mainly, calf) of the seated occupant from below, is rotated forward about the front side of the seat cushion 7 so as to be adjusted from the normal state of extending downward from the front portion of the seat cushion 7 to the expanded state of supporting the leg of the occupant. Thus, the seated occupant can be relaxed in the state of lifting up the leg.

The ottoman 8 is often provided particularly in the second-row seat of the vehicle. However, the present disclosure is not limited to the second-row seat, and may be provided in the first-row seat or the third-row seat according to a vehicle type.

The configuration of the ottoman 8 will be described with reference to FIGS. 3 to 6. Components of the ottoman 8 of the present disclosure are roughly divided into a top plate 8a, a substantially U-shaped slide frame 8b, a slide frame support 8c, a bracket 8d substantially U-shaped in a sectional view, an ottoman cushion (not illustrated), a cover (not illustrated), and the like.

The top plate 8a has a substantially rectangular plate shape, and both ends in a width direction are bent downward. Further, one side 8b1 of the substantially U-shaped slide frame 8b is firmly fixed in the bent inside of the top plate 8a, and one surface side of the bracket 8d substantially U-shaped in a sectional view is firmly fixed in the back surface of the top plate 8a. Further, the slide frame supporting bracket 8c is attached in the bracket 8d. Herein, the slide frame supporting bracket 8c and the bracket 8d may not be configured separately but be molded integrally. Next, a support 8f is inserted into the slide frame supporting bracket 8c, and the support 8f is fixed in the slide frame supporting bracket 8c by the claw 8b4. Further, the other side 8b2 of the slide frame 8b is inserted into the support 8f. With such a configuration, the length of the slide frame 8b of the bracket 8d can be adjusted. That is, the top plate 8a can be expanded and contracted by sliding the slide frame 8b with respect to the slide frame support 8c, and thus a favorite position can be adjusted depending on a height of the occupant, a position of the leg, and the like.

Herein, the other side 8b2 of the substantially U-shaped slide frame 8b has a notch groove 8b3 for slidably fixing the top plate 8a. Further, the slide frame supporting bracket 8c is provided with a lock claw (not illustrated) which is biased by a spring, and an expansion and contraction position of the ottoman 8 can be fixed by locking the lock claw in the notch groove 8b3 provided in the other side 8b2 of the substantially U-shaped slide frame 8b. As for the configuration, there are provided a substantially U-shaped operation part (not illustrated) straddling the other side 8b2 of the slide frame 8b and the lock claw biased by the spring, and the other side 8b2 of the slide frame 8b is interposed between the operation part and the lock claw. As for an operation, when the operation part is pressed, the lock claw biased by the spring is pressed in, and the lock claw is not engaged with the notch groove 8b3, whereby the other side 8b2 of the slide frame 8b can be slid. Further, when the operation part returns, the lock claw biased by the spring protrudes, and the lock claw is engaged in the notch groove 8b3, thereby fixing the other side 8b2 of the slide frame 8b.

A reclining mechanism which is the same mechanism as the reclining mechanism of the seat back 3 is interposed in the ottoman 8, and the angle of the calf placing surface 8e can be adjusted by the reclining mechanism.

The top plate 8a supports the ottoman cushion forming the calf placing surface 8e. Further, a cover is provided to cover the entire ottoman cushion and top plate 8a. Incidentally, herein, a cushion material of the ottoman cushion is formed by a cushioning material such as polyurethane foam, and the calf can be received by a cushioning property. A skin material is desirably a flexible material such as textile fabric or synthetic leather.

The description will be given about various mechanisms used in the vehicle seat according to the present disclosure. However, the various mechanisms except for a mechanism particularly requiring the detailed description are a well-known technology. Thus, hereinafter, a basic configuration of such a well-known technology will not be described in detail but the mechanism is described simply.

Figure 7:
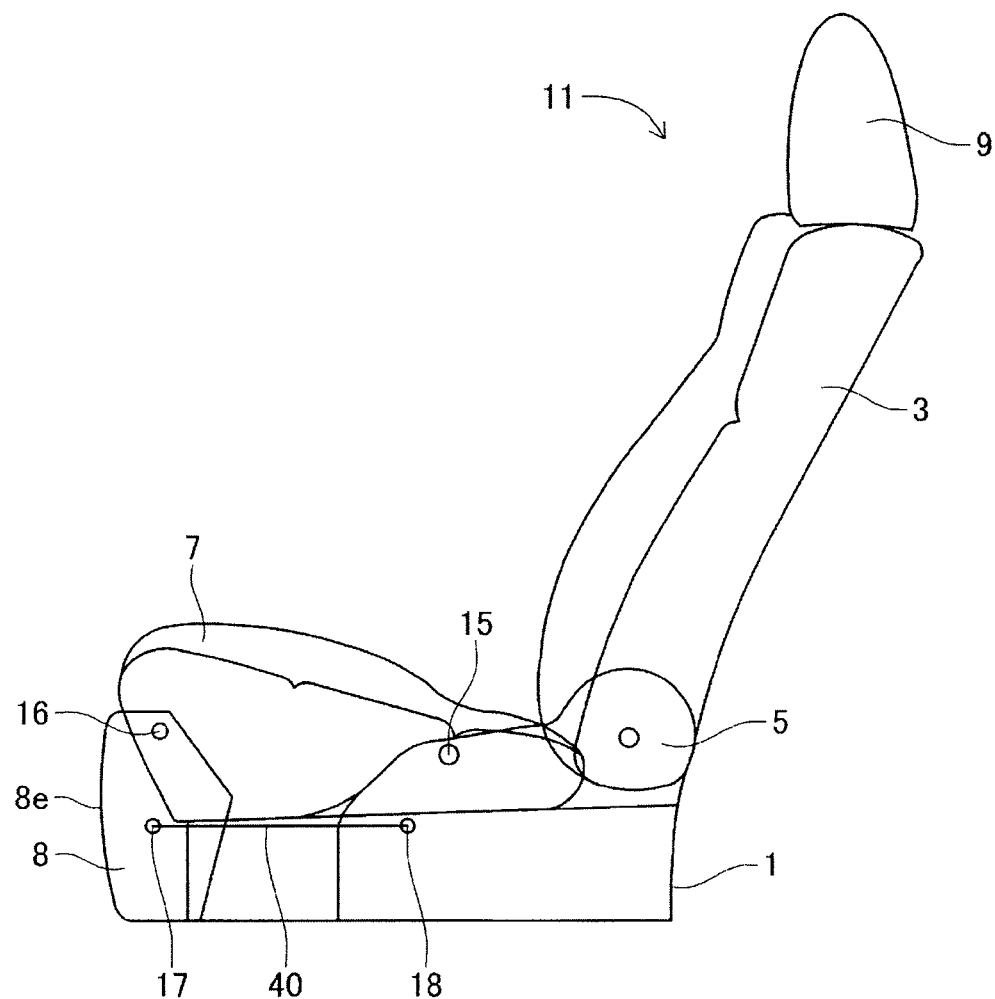
Figure 8:
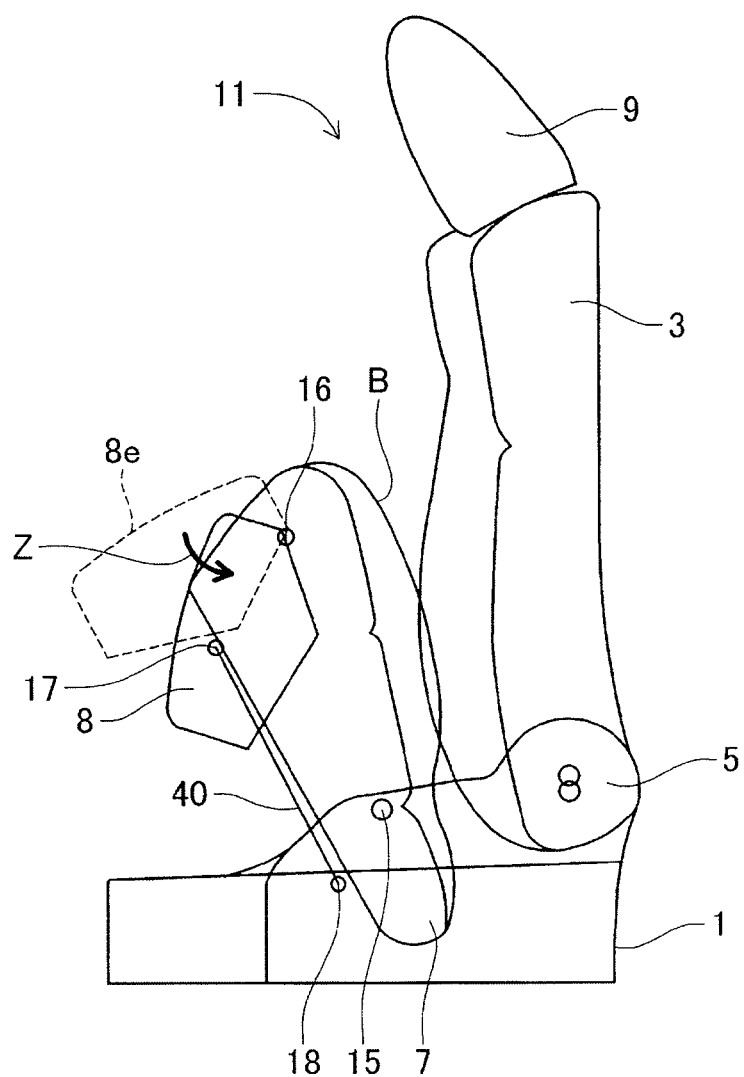

As illustrated in FIGS. 7 and 8, the reclining mechanism 5 can change the inclination angle of the seat back 3 with respect to the seat cushion 7, and can tilt the seat back 3 forward. In the seat back 3, the both lower ends are connected with the rear end of the seat cushion 7 through a pair of reclining mechanisms 5. Further, since the pair of reclining mechanisms 5 are switched between a locked state and a released state by a reclining operation lever, the seat back 3 can be held in a posture position (seatable position) of standing from the seat cushion 7, or can be released from the state to be in a state A of being inclined forward to the upper surface of the seat cushion 7. Incidentally, one pair of reclining mechanisms 5 are laterally symmetric with each other, and have substantially the same structure. Further, the seat back 3 may not be configured such that the both lower ends are connected with the rear end of the seat cushion 7 through the pair of reclining mechanisms 5.

As illustrated in FIGS. 7 and 8, the tip-up mechanism includes a locking mechanism (not illustrated) which fixes the seat cushion 7 in a normal position and an operation lever (not illustrated) which is connected with the locking mechanism. When the operation lever is operated, the fixed state by the locking mechanism is released, and the seat cushion 7 is flipped up to the tip-up state B by a biasing force of a spring (not illustrated).

In a tip-up type seat, when the seat back 3 is tilted from a seating position of a predetermined inclination angle to a predetermined forward inclination angle, the seat cushion 7 becomes in the tip-up state B where the front end thereof is flipped up, that is, the seat cushion 7 is tipped up in conjunction with the forward tilting of the seat back 3.

The seat sliding mechanism is a mechanism which slides the base 1, on which the vehicle seat body is placed, in a front and rear direction of the vehicle so as to be moved to an advance limit position or a retreat limit position of a sliding area. The seat sliding mechanism includes the locking mechanism (not illustrated) which locks and releases the sliding of the vehicle seat body in an arbitrary position in a slide direction.

As a specific component of a sliding mechanism which performs sliding manually, for example, there are considered a lower rail which extends in the front and rear direction of the vehicle seat 11 assembled with the floor F of the vehicle, an upper rail which is assembled with the base 1 to be slidable with respect to the lower rail, and the locking mechanism which can lock the sliding of the upper rail with respect to the lower rail.

In addition, an electromagnetic motor which relatively moves the lower rail and the upper rail is set as a component, and when the electromagnetic motor is driven, the vehicle seat can be slid with electric operation in the progressing direction of the vehicle or a direction opposite to the progressing direction.

The movement from the normal state of the ottoman 8 of the present disclosure to the expanded state is performed by the link mechanism 20. That is, when the link mechanism 20 is operated, the ottoman 8 is switched between the expanded state of being expanded substantially horizontally to the front side of the seat cushion 7 and the normal state of being contained below the front surface of the seat cushion 7. The description will be given about the link mechanism 20.

Figure 4:
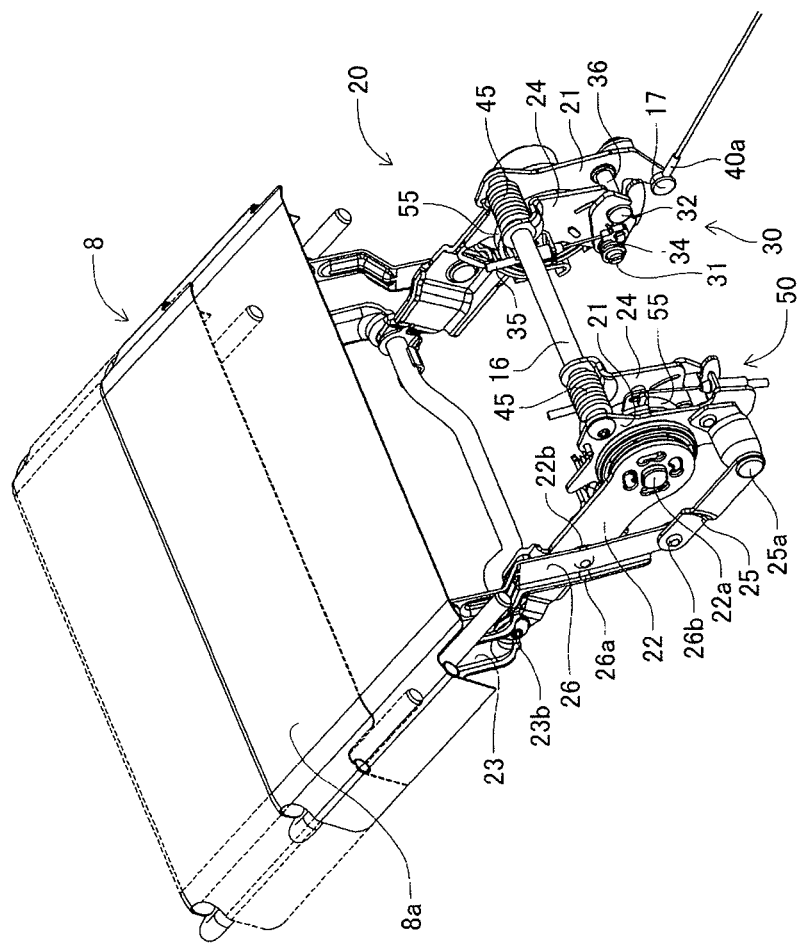
FIG. 4 is a perspective view illustrating the link mechanism and the ottoman in an expanded state.

As illustrated in FIG. 4 and the like, the link mechanism 20 is pivotally supported about a storing shaft 16 storing the ottoman 8, and the ottoman 8 is provided in the link mechanism 20. Incidentally, the link mechanism 20 is provided in each of the right and left sides of the ottoman 8.

Figure 2:
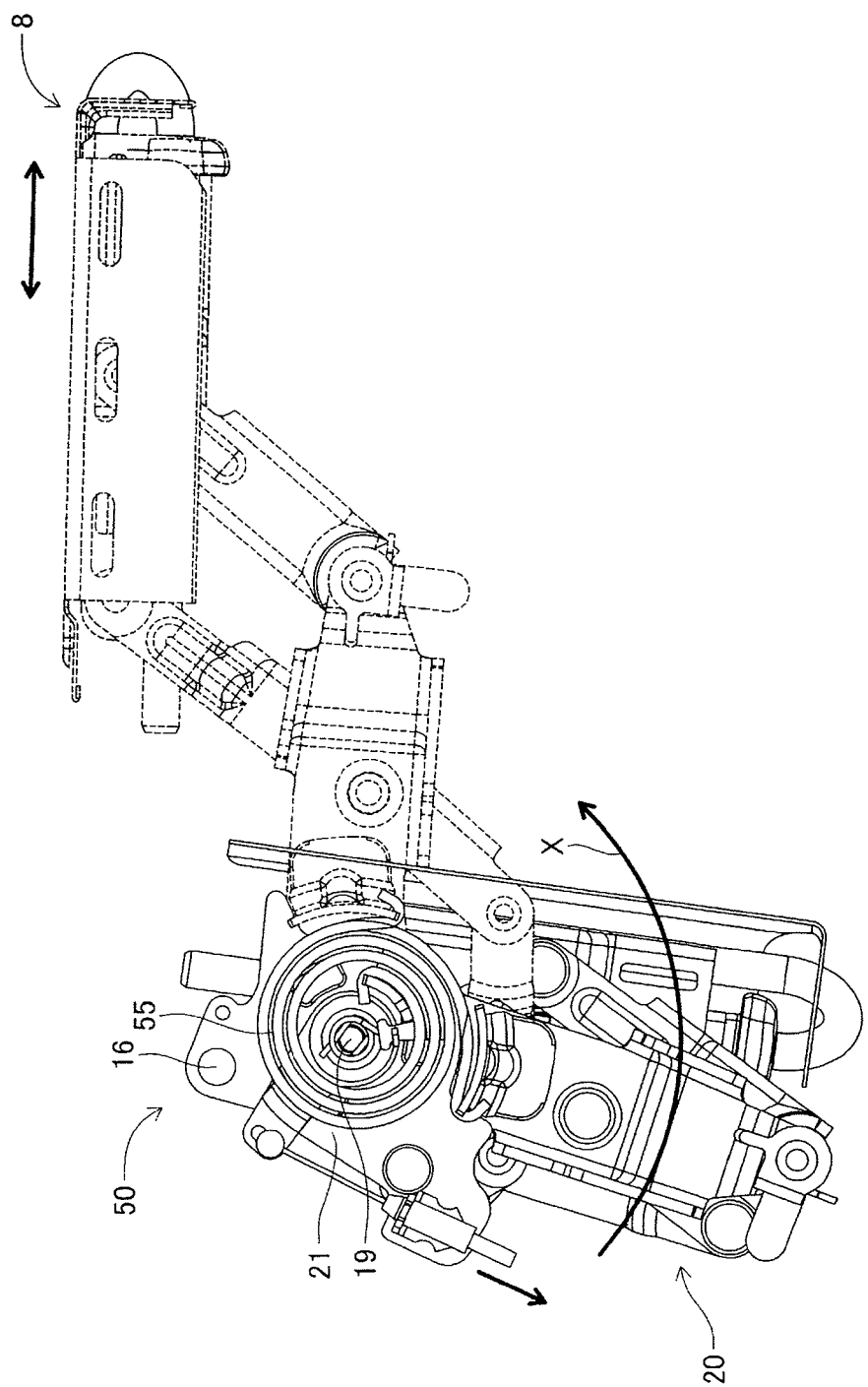
FIG. 2 is a side view illustrating one side of a link mechanism and an ottoman as a pulling-in type example.
Figure 6:
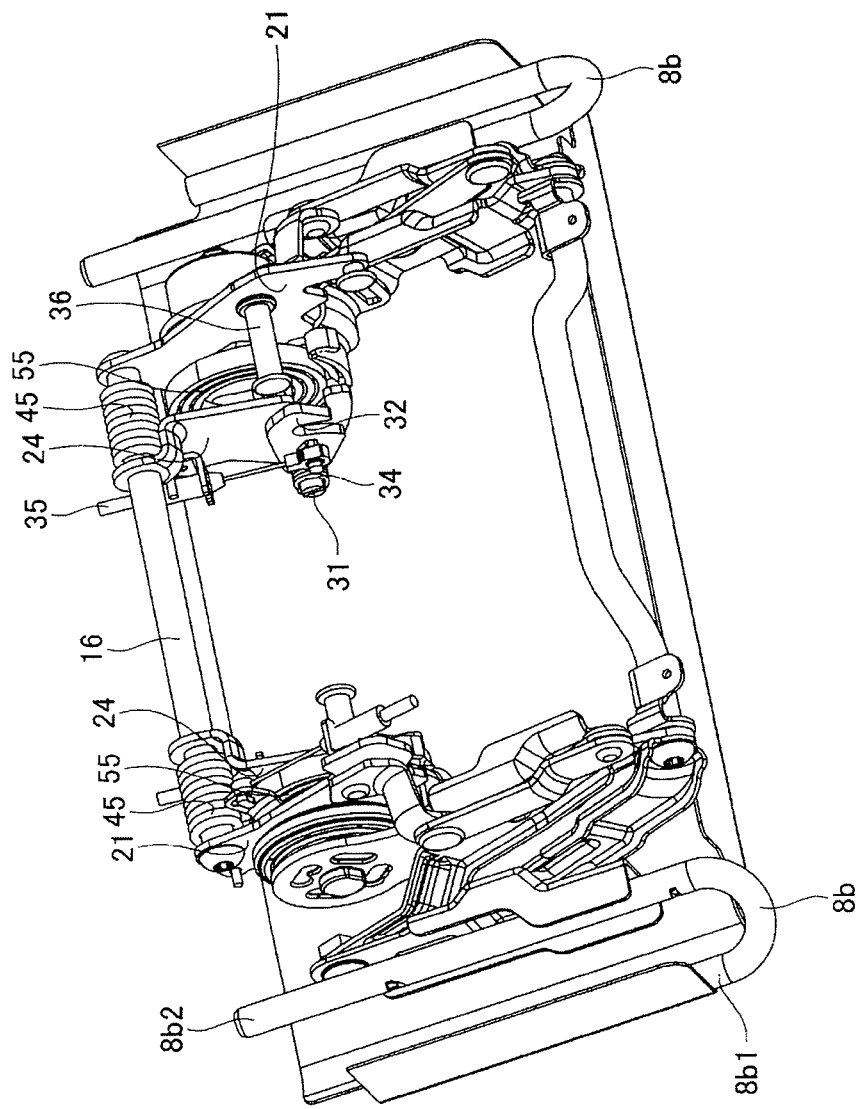
FIG. 6 is a perspective view illustrating the link mechanism and the ottoman in a stored state in back view.

As illustrated in FIGS. 2 and 6, the components of the link mechanism 20 are roughly divided into a first bracket 21, a first support rod 22, a first link member 23, a second bracket 24, a second support rod 25, a second link member 26, and the like. One ends of the first support rod 22 and the second support rod 25 configuring the link mechanism 20 are coupled with the first bracket 21 to be rotatable with shafts 22a and 25a as a fulcrum, respectively.

The first link member 23 and the second link member 26 configuring the link mechanism 20 are disposed in substantially parallel with each other. The one ends of the first link member 23 and the second link member 26 are coupled with the bracket 8d of the ottoman 8 through respective shafts, and the other ends are coupled with the first support rod 22 and the second support rod 25 through respective shafts 23b and 26b. Further, an intermediate part 26a of the second link member 26 is rotatably attached in an intermediate part 22b of the first support rod 22. In other words, the link mechanism 20 is configured by the first support rod 22, the second support rod 25, the first link member 23, and the second link member 26.

As illustrated in FIGS. 2, 4, and 6, a spiral spring 55 (biasing member) is arranged between the first bracket 21 and the second bracket 24. Specifically, one end of the spiral spring 55 is fixed in the bracket (not illustrated) provided in the first support rod 22, and the other end of the spiral spring 55 is fixed in the bracket (not illustrated) provided in the first bracket 21. The ottoman 8 is biased by the spiral spring 55 in the extracting direction X.

When the ottoman 8 is locked by an expansion locking mechanism (not shown), but when the locking is released by operating the operation lever of the expansion locking mechanism, the spiral spring 55 biases the ottoman to move in the extracting direction X. As described above, the ottoman 8 can be moved by the spiral spring 55 in the extracting direction X.

Figure 5:
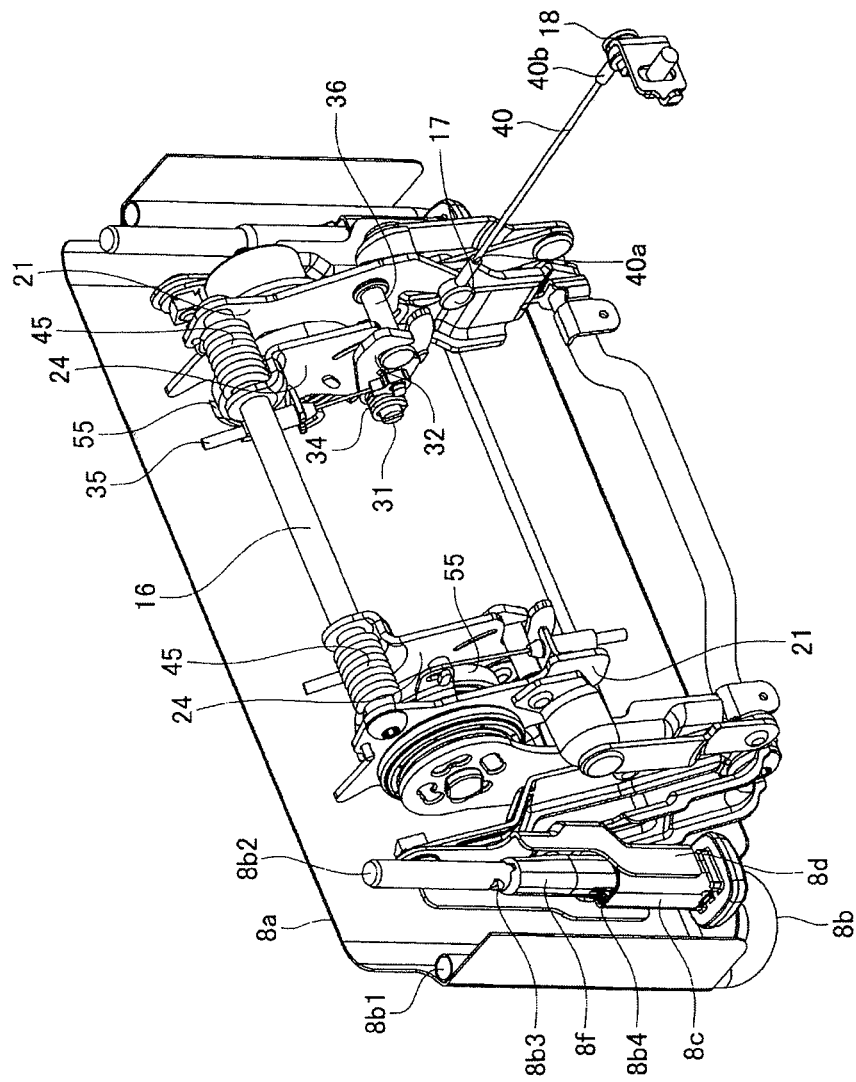
FIG. 5 is a perspective view illustrating the link mechanism and the ottoman in a normal state in back view.

As illustrated in FIGS. 4 to 6, in the storing shaft 16, a biasing spring 45 (spiral spring) is inserted between the first bracket 21 and the second bracket 24. The biasing spring 45 biases the ottoman 8 to return from the stored position to the normal position.

As illustrated in FIG. 3, a storage locking mechanism 30 can fix or release the ottoman 8, which is biased in the normal direction Y, with respect to the seat cushion 7. When the locking of the storage locking mechanism 30 is released, the ottoman 8 can be relatively moved with respect to the seat cushion 7 in the storing direction Z which is a direction opposite to the extracting direction.

When the ottoman 8 is in the normal state, the ottoman 8 is locked by the storage locking mechanism 30 so as not to be moved, but when the locking is released by operating the operation lever of the storage locking mechanism 30, the ottoman 8 can be moved in the storing direction Z.

The components of the storage locking mechanism 30 are roughly divided into a support shaft 31, a hook 32, a hook supporting bracket (second bracket 24), a biasing spring 34 (see FIGS. 4 to 6), an operating unit 35, a locking bar 36, a locking bar supporting bracket (first bracket 21), and the like.

As illustrated in FIG. 4, and the like, the hook 32 is pivotally supported rotatably about the support shaft 31 standing in a direction vertical to the hook supporting bracket (second bracket 24), and is biased by the biasing spring 34 in a locking direction. Further, when the hook 32 is engaged in the locking bar 36 standing in a direction vertical to the locking bar supporting bracket (first bracket 21), the ottoman 8 itself is unrotatably locked.

Herein, the locking bar supporting bracket (first bracket 21) is pivotally supported by the storing shaft 16, and is rotatable with the storing shaft 16 as a fulcrum. On the other hand, the hook supporting bracket (second bracket 24) is fixed in the storing shaft 16, and the storing shaft 16 is fixed in a frame of the seat cushion 7. Further, the hook supporting bracket (second bracket 24) may be fixed in the frame of the seat cushion 7.

One end of the operating unit 35 is engaged in the hook 32. As illustrated in FIG. 3, the operating unit 35 is operated, specifically, the operating unit 35 is pulled up in a direction indicated by an arrow, so that the hook 32 is rotated in a direction (arrow direction) opposite to a biasing direction of the biasing spring 34. Thus, the engagement of the hook 32 and the locking bar 36 is released, and the fixing of the ottoman 8 is released to be rotatable.

As described above, the locking bar supporting bracket (first bracket 21) is pivotally supported by the storing shaft 16, and is rotatable. Therefore, the ottoman 8 provided through the link mechanism 20 also can be rotated. Further, as described as follows, the ottoman 8 can be moved with the storing shaft 16 as a fulcrum in the storing direction Z by being tensioned by the connecting member 40 such as a wire.

In the expanded state and the normal state, the storage locking mechanism 30 is in a state where the locking bar 36 is engaged and locked in the hook 32 (FIGS. 4 and 5). However, in the stored state, the locking bar 36 is not engaged in the hook 32 and is not locked therein (see FIG. 6). Conversely, since the locking bar is not locked, the ottoman 8 can move to be in the stored state.

In the pulling-in type, the storage locking mechanism 30 and the base 1 are connected by the connecting member 40. Specifically, as illustrated in FIG. 3, one side 40a of the connecting member 40 is rotatably connected in a pull-in shaft 17 provided in the first bracket 21 which is a component of the storage locking mechanism 30. Further, the other side 40b of the connecting member 40 is rotatably connected in a fixed rotating shaft 18 provided in a proper position of the base 1, for example, an inner wall surface on the side surface.

Herein, for example, a wire which cannot be expanded and contracted is desirably used as the connecting member 40. However, in addition to the wire, any type of member may be used as long as similar structural configuration can be achieved.

The description will be given about a rotational center of the vehicle seat 11 of the present disclosure. The rotating shaft 15 which is a rotational center used when the seat cushion 7 tips up is provided in the base 1, and the seat cushion 7 can be tipped up with the rotating shaft 15 as a fulcrum. The rotating shaft 15 is a first rotational center.

The storing shaft 16 which is a rotational center for storing the ottoman 8 is provided in the seat cushion 7, and the ottoman 8 can be stored in the storing direction Z with the storing shaft 16 as a fulcrum. The storing shaft 16 is a second rotational center.

As illustrated in FIG. 5, one side 40a of the connecting member 40 is rotatably connected with the pull-in shaft 17 provided in one side of the first bracket 21. The pull-in shaft 17 is a third rotational center.

Similarly, as illustrated in FIG. 5, the other side 40b of the connecting member 40 is rotatably connected with the fixed rotating shaft 18 provided in the proper position of the base 1. The fixed rotating shaft 18 is a fourth rotational center.

As described above, the link mechanism is configured which includes the first rotational center to the fourth rotational center.

As illustrated in FIG. 7, the fourth rotational center (fixed rotating shaft 18) is positioned on the front side from the first rotational center (rotating shaft 15). In addition, the third rotational center (pull-in shaft 17) is positioned on the front side from the second rotational center (storing shaft 16). However, as long as similar operation is achieved, that is, the ottoman 8 is pulled in through the connecting member 40 by the tip-up of the seat cushion 7 and the like so that the ottoman 8 can be moved in the storing direction Z which is a direction opposite to the extracting direction X, a distance, an angle, a positional relation, and the like of respective rotational centers are arbitrary.

When the rotational center is deviated, a radius change occurs. When the seat cushion 7 is gradually tipped up, the ottoman 8 is gradually pulled in through the wire which is the connecting member 40, and finally becomes in the stored state. That is, since the wire is interposed therebetween, the ottoman 8 can be pulled in, and the ottoman 8 can be rotated.

The positions of the storing shaft 16 (second rotational center) which stores the ottoman 8 and the pull-in shaft 17 (third rotational center) which pulls in the ottoman 8 are deviated and eccentric. For this reason, the ottoman 8 is pulled in by the wire according to the radius change resulting from the eccentricity. In this way, the storing shaft 16 (second rotational center) and the pull-in shaft 17 (third rotational center) are separate shafts. Further, an extraction shaft 19 for rotating the ottoman 8 in the extracting direction X is a shaft separate from the storing shaft 16 (second rotational center).

Hereinafter, the description will be given about various operation patterns of the pulling-in type.

First, the description will be given about an example where the ottoman 8 rotates in the storing direction in conjunction with the forward tilting of the seat back 3 and the tip-up of the seat cushion 7.

When the reclining operation lever is operated, the seat back 3 becomes in a forward-tiltable state and/or the seat cushion 7 becomes in a tippable state. Thus, the operating unit 35 of the storage locking mechanism 30 is operated so that the hook 32 comes off from the locking bar 36, and the locking of the storage locking mechanism 30 is released so that the ottoman 8 is in a rotatable state. Further, when the seat cushion 7 is tipped up, the ottoman 8 is tensioned by the connecting member 40 such as the wire so as to rotate in the storing direction Z. Further, finally, the ottoman 8 is moved to be in the stored state.

As for other members, the operating unit 35 of the storage locking mechanism 30 may be operated simultaneously with the operation of the reclining operation lever of the seat back 3, so that the hook 32 comes off from the locking bar 36, and thus the locking of the storage locking mechanism 30 may be released. Subsequent operations are the same as the above description.

Next, the description will be given about an example in which the ottoman 8 rotates in the storing direction Z in conjunction only with the tip-up of the seat cushion 7. A tip-up operation lever of the seat cushion 7 is operated, and the seat cushion 7 becomes in the tippable state. The operating unit 35 of the storage locking mechanism 30 is operated, and the hook 32 comes off from the locking bar 36. Then, the locking of the storage locking mechanism 30 is released so that the ottoman 8 is in the rotatable state. Further, when the seat cushion 7 is tipped-up from the state, the ottoman 8 is tensioned by the connecting member 40 such as the wire so as to rotate in the storing direction Z. Further, finally, the ottoman 8 is moved to be in the stored state.

As for other members, the operating unit 35 of the storage locking mechanism 30 may be operated simultaneously with the operation of the tip-up operation lever of the seat cushion 7, and thus the hook 32 may come off from the locking bar 36. Subsequent operations are the same as the above description.

The operating unit 35 of the storage locking mechanism 30 may be provided in a separate position, and the operating unit 35 may be independently operated so that the hook 32 comes off from the locking bar 36. Subsequent operations are the same as the above description.

As described above, the description has been given about various operation patterns of the pulling-in type. However, the description is merely an example, and other patterns may be adapted in addition to the described patterns as long as similar effect can be achieved. In summary, preferably, the locking of the storage locking mechanism 30 is released, and the ottoman 8 rotates in conjunction with the forward tilting of the seat back 3 and/or the tip-up of the seat cushion 7.

As described above, the ottoman 8 returns from the stored state to the normal state by the biasing spring 45. Specifically, one end of the biasing spring 45 is fixed in the first bracket 21, and the other end of the biasing spring 45 is fixed in the second bracket 24. The ottoman 8 is biased by the biasing spring 45 in the normal direction Y, and the biasing spring 45 biases the ottoman 8 to return from the stored state to the normal state.

Next, the description will be given about the pressing-in type as another example. In the pressing-in type, the ottoman 8 biased by the biasing spring 45 in the normal direction Y is movable by the pressure in a direction opposite to the biasing.

The pressing-in type components include the biasing spring 45 which biases the ottoman against the relative movement in the storing direction Z. While the pressing-in type components are almost the same as the above-described pulling-in type components, the pressing-in type components do not include the connecting member 40 such as the wire, which is different from the above-described pulling-in type component. Further, a pattern in which the locking of the storage locking mechanism 30 is released is the same as that of the pulling-in type. That is, the locking of the storage locking mechanism 30 is released according to any one of the forward tilting of the seat back 3, the tip-up of the seat cushion 7, and the operation of the operating unit 35.

The operating unit 35 of the storage locking mechanism 30 may be operated simultaneously with the operation of the reclining operation lever of the seat back 3, so that the hook 32 comes off from the locking bar 36, or the operating unit 35 of the storage locking mechanism 30 may be operated simultaneously with the operation of the tip-up operation lever of the seat cushion 7, so that the hook 32 comes off from the locking bar 36.

When the locking is released, the ottoman 8 becomes in the rotatable state, and the ottoman 8 can be pressed in. Therefore, the seat sliding mechanism can be used to slide the vehicle seat 11 from the state, and the ottoman 8 can be rotated by pressing the ottoman 8 in the back surface of the seat back 3 of the first-row seat.

In this example, since the base 1 and the storage locking mechanism 30 are not connected by the connecting member 40 such as the wire, the ottoman 8 is not rotated in conjunction with the tip-up of the seat cushion 7 although the seat cushion 7 is tipped-up. In addition, in this example, a configuration in which the ottoman 8 is biased in the normal direction Y is the same as the above-described configuration.

Incidentally, in the above-described embodiments, the components, the shape, the number, and the arrangement of the vehicle seat are described exemplarily. The structural configuration can be arbitrarily changed in design as long as the same function and operation can be achieved.

As described with reference to the embodiments, according to an aspect of the present disclosure, there is provided a vehicle seat with a foldable ottoman, including: a base mounted to a floor of a vehicle; a seat cushion which is placed on the base and can be tipped up with a rotating shaft as a fulcrum; an ottoman which is provided on a front side of the seat cushion and is extractable between a normal position and an extracted position; a seat back provided in a rear end of the seat cushion; and a storage locking mechanism capable of relatively moving the ottoman with respect to the seat cushion in a storing direction which is a direction opposite to an extracting direction, wherein the storage locking mechanism is operated such that the seat back becomes in a forward-tiltable state and/or the seat cushion becomes in a tippable state, and locking of the locking mechanism is released so that the ottoman becomes movable in the storing direction.

The vehicle seat with the foldable ottoman may further include: a connecting member in which one side is connected with a first bracket of the storage locking mechanism, and the other side is connected with a proper position of the base: and the ottoman moves in the storing direction in conjunction with tip-up of the seat cushion.

The vehicle seat with the foldable ottoman may further include: a biasing member which biases the ottoman against the relative movement in the storing direction.

The vehicle seat with the foldable ottoman may further include: an extraction shaft for rotating the ottoman in the extracting direction; and a storing shaft which is a separate shaft from the extraction shaft and is used when the ottoman is rotated in the storing direction.

In the vehicle seat with the foldable ottoman, the connecting member may be a wire which is not expanded and contracted.

In the vehicle seat according to the aspect of the present disclosure, the ottoman can be simply moved in the storing direction. Therefore, in a case where the seat is slid forward, the sliding of the seat is not restricted by the ottoman, thereby securing a sufficient luggage compartment space and securing a sufficient walk-through space.

In the vehicle seat according to the present disclosure, when the seat cushion is tipped up, the ottoman may be simply moved in conjunction therewith in the storing direction. Therefore, in a case where the seat is slid forward, the sliding of the seat is not restricted by the ottoman, thereby securing the sufficient luggage compartment space and securing the sufficient walk-through space.

In the vehicle seat according to the present disclosure, in a case where the seat cushion tipped up together with the ottoman is slid forward, the ottoman abuts on the seat back on the front side, and further when slid forward, the ottoman is stored against the biasing member. Therefore, the seat can be slid forward so as to secure the sufficient luggage compartment space and to secure the sufficient walk-through space.

In the vehicle seat according to the present disclosure, the rotation in the extracting direction can be configured separately from the rotation in the storing direction.

In the vehicle seat according to the present disclosure, the connecting member is configured as a wire which is not expanded and contracted. Therefore, when the seat cushion is tipped up, the ottoman can be reliably stored in conjunction with the tipping-up.

What is claimed is:

1. A vehicle seat with a foldable ottoman, the vehicle seat comprising:
    a base mounted to a floor of a vehicle;
    a seat cushion that is placed on the base and configured to be tippable upward towards a storage position with a rotating shaft as a fulcrum;
    an ottoman that is provided on a front side of the seat cushion and extractable between a normal position and an extracted position;
    a seat back that is provided in a rear end of the seat cushion; and
    a storage locking mechanism that is capable of relatively moving the ottoman with respect to the seat cushion in a storing direction which is a direction opposite to an extracting direction,
    wherein the storage locking mechanism is released so that the ottoman is movable in the storing direction when one of the following states is satisfied:
        i) a state where the storage locking mechanism is operated;
        ii) a state where the seat cushion is tipped upward to a tippable state;
        iii) a state where the seat back is tilted forward to a forward-tiltable state; and
        iv) a state where the seat cushion is tipped upward to the tippable state and where the seat back is tilted forward to the forward-tiltable state.

2. The vehicle seat according to claim 1 further comprising:
    a connecting member in which one side is connected with a first bracket of the storage locking mechanism, and the other side is connected with a proper position of the base,
    wherein the ottoman moves in the storing direction in conjunction with tip-up movement of the seat cushion.

3. The vehicle seat according to claim 2,
    wherein the connecting member is a wire which is not expanded and contracted.

4. The vehicle seat according to claim 1 further comprising:
    a biasing member that biases the ottoman against the relative movement in the storing direction.

5. The vehicle seat according to claim 1 further comprising:
    an extraction shaft for rotating the ottoman in the extracting direction; and
    a storing shaft which is a separate shaft from the extraction shaft and is used when the ottoman is rotated in the storing direction.

* * * * *